United States Patent [19]

Cecil

[11] Patent Number: 4,542,277
[45] Date of Patent: Sep. 17, 1985

[54] RESISTANCE SPOT WELDING GUN WITH WELD QUALITY DETECTION FEATURE

[76] Inventor: Dimitrios G. Cecil, 1277 Ashover Dr., Bloomfield Hills, Mich. 48013

[21] Appl. No.: 614,797

[22] Filed: May 29, 1984

[51] Int. Cl.$^4$ .............................................. B23K 11/24
[52] U.S. Cl. ..................................... 219/109; 219/89
[58] Field of Search .......................... 219/89, 109, 110

[56] References Cited

U.S. PATENT DOCUMENTS

| | | | |
|---|---|---|---|
| 1,847,890 | 3/1932 | Osborne | 219/89 |
| 3,136,879 | 6/1964 | Waltonen | 219/89 |
| 3,270,604 | 9/1966 | Waltonen | |
| 3,299,247 | 1/1967 | Waltonen | 219/89 |
| 3,396,260 | 8/1968 | Waltonen | 219/89 |
| 3,400,242 | 9/1968 | Waller | 219/110 |
| 3,404,252 | 10/1968 | Michael | 219/110 |
| 3,609,285 | 9/1971 | Scarpelli | 219/109 |
| 3,708,648 | 1/1973 | Croucher et al. | 219/109 |
| 3,727,822 | 4/1973 | Umbaugh | 219/109 |
| 4,419,558 | 12/1983 | Stiebel | 219/109 |

FOREIGN PATENT DOCUMENTS 1113045  6/1960  Fed. Rep. of Germany ........ 219/89

OTHER PUBLICATIONS

Nied, "The Finite Element Modeling of the Resistance Spot Welding Process", Welding Research Supplement, pp. 123–132 (Apr., 1984).

Primary Examiner—Clifford C. Shaw
Attorney, Agent, or Firm—Harness, Dickey & Pierce

[57] ABSTRACT

A method and apparatus are disclosed for detecting weld nugget growth on a workpiece during a welding operation using a resistance spot welding gun. In the preferred embodiment, a piston rod is slidably mounted in a cylinder and is connected at one end to an electrode of the gun. The opposite end of the piston rod extends rearwardly through the cylinder and is coupled to a sensor assembly for detecting the amount of movement of the piston rod created by weld nugget growth on the workpiece during the welding cycle.

17 Claims, 8 Drawing Figures

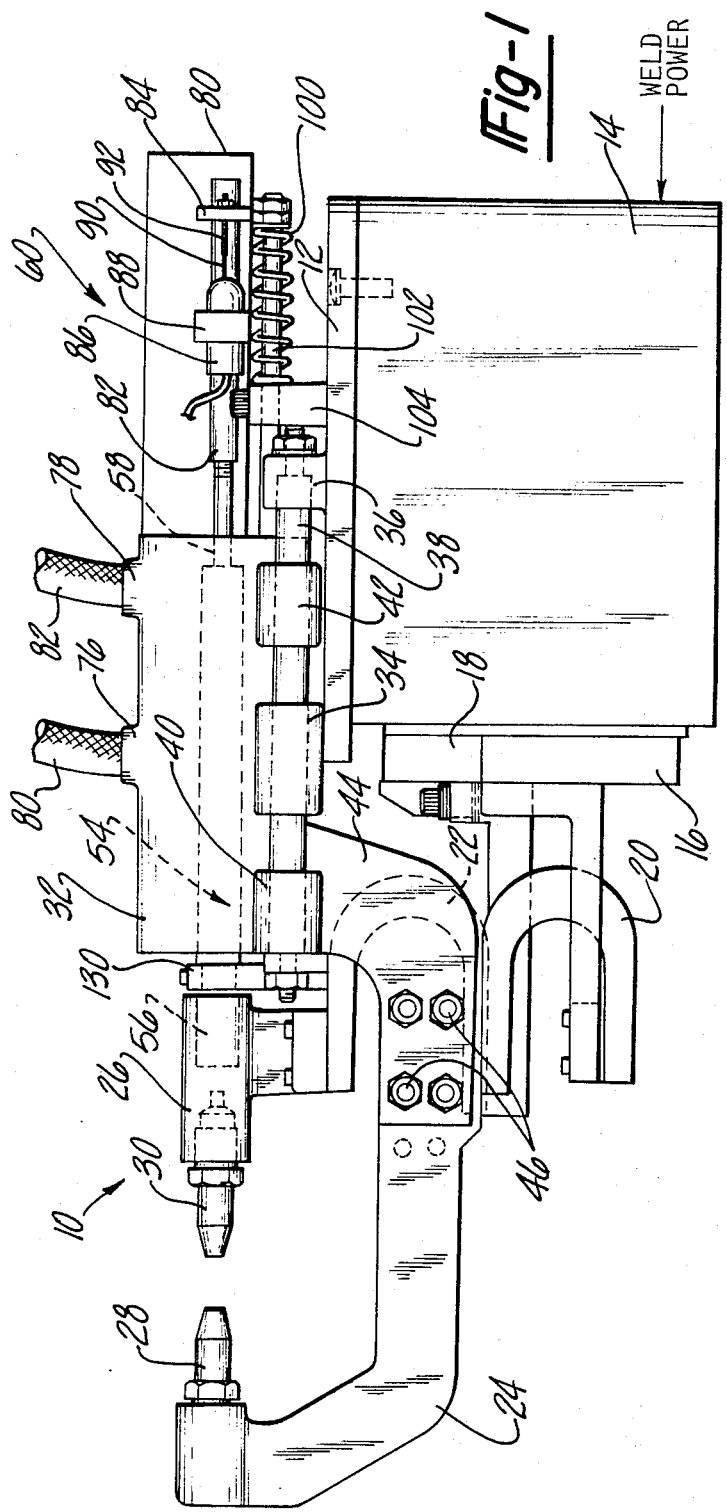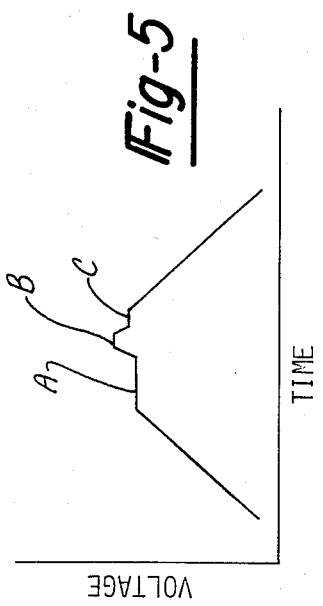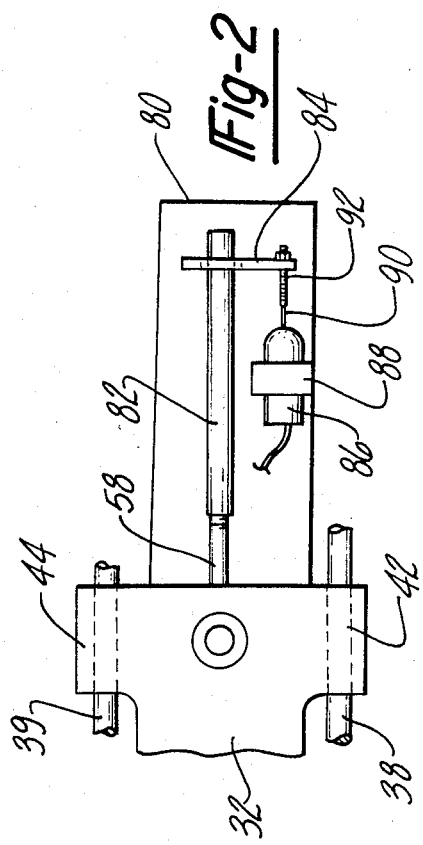

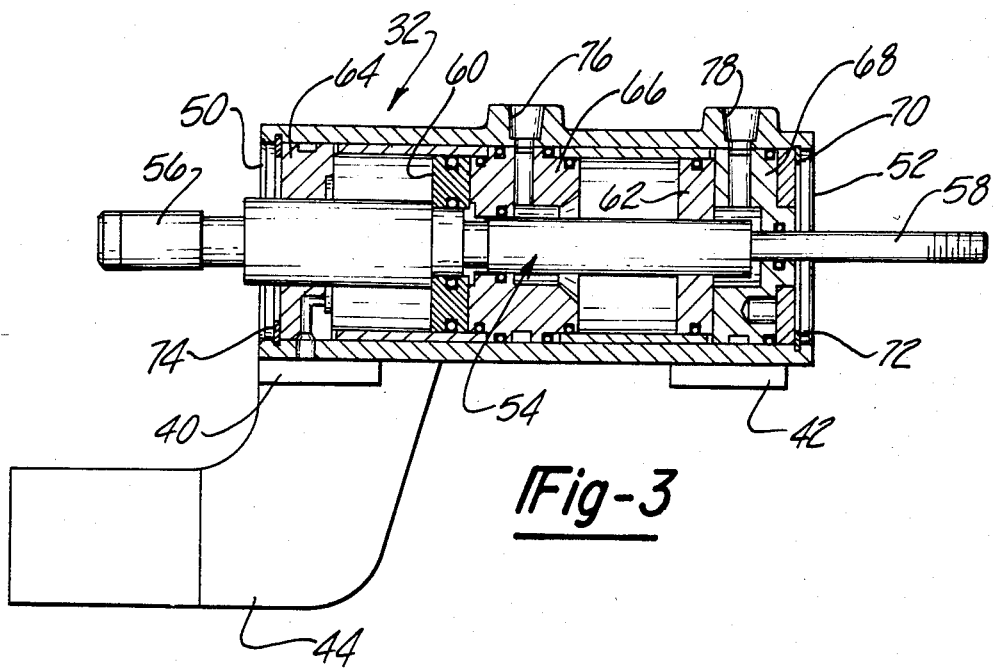
Fig-3
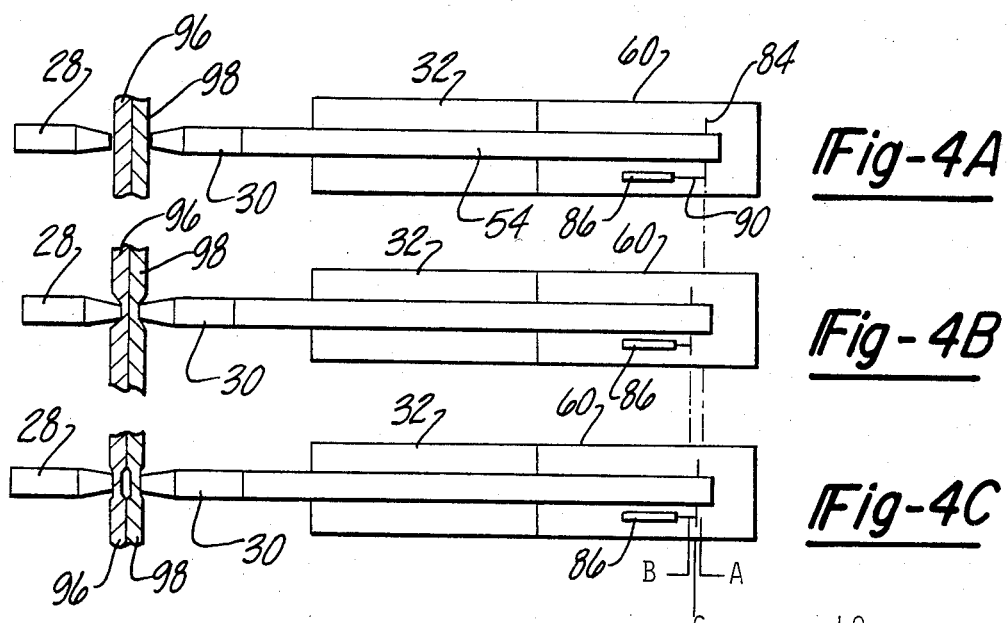
Fig-4A
Fig-4B
Fig-4C
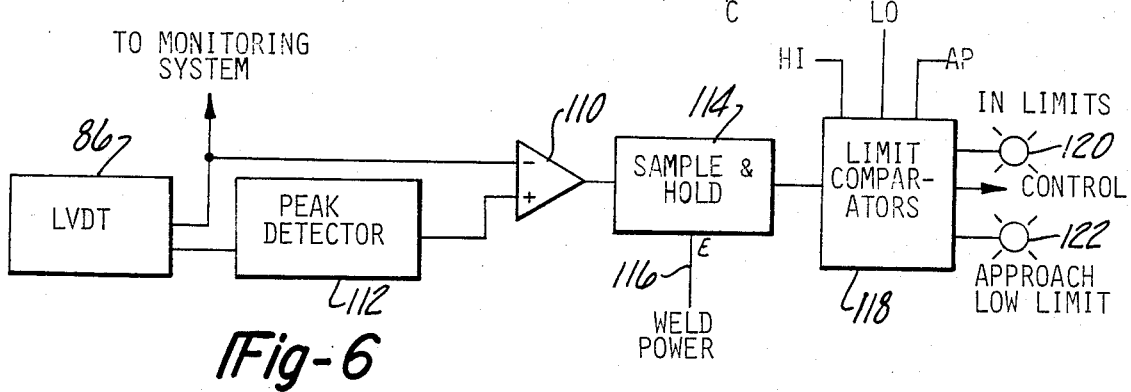
Fig-6

RESISTANCE SPOT WELDING GUN WITH WELD QUALITY DETECTION FEATURE

TECHNICAL FIELD

This invention relates to methods and apparatus for performing welding operations and, more particularly, to techniques for detecting the quality of the weld during resistance spot welding operations.

BACKGROUND

Conventional resistance spot welding techniques employ a method by which metal surfaces are joined together in one or more spots by the heat generated by the resistance to the flow of electric current through the workpieces that are held together under force by the electrodes. The contacting surfaces in the region of current concentration are heated by a pulse of high amperage current to form what is known as a weld nugget at the interface between the two surfaces. Ordinarily, when the flow of current ceases, the electrode forces are maintained for a while to allow the weld nugget to cool and solidify. An excellent discussion of the details of the metalurgical phenomena that occurs during resistance spot welding is found in Nied, "The Finite Element Modeling of the Resistance Spot Welding Process", Welding Research Supplement, pages 123–132 (April, 1984).

The popularity of resistance spot welding is due in large part to its capability of rapidly producing welds with apparatus that can be used in high volume, automated production. For example, the recent trend is for vehicle manufacturers to use automatic machinery employing resistance spot welding guns attached to the ends of robot arm actuators to automatically position the gun and control the welding cycle. While resistance spot welding has these and many other advantages, it is unfortunately somewhat difficult to control the process satisfactorily in order to produce consistently good welds. Many different factors must be controlled such as voltage, current, pressure, heat loss, shunting, and electrode wear, as well as the thickness and composition of the workpiece material. Many of these variables are difficult to consistently control.

Several attempts have been made to automatically control resistance spot welding processes. For example, some techniques are designed to regulate the amount of energy used during the welding cycle. To this end, current sensors and voltage regulators have been incorporated in feedback systems which compare the detected levels with certain preset references. These feedback systems are disadvantageous from the standpoint that they do not directly detect physical characteristics of the weld itself but instead rely upon detection of secondary parameters. In other words, they detect the means and not the end result.

Other techniques provide some means for determining whether the metal of the workpieces have reached a molten state. If the metals to be welded do not reach the temperature required to become molten, an insufficient weld or no weld at all will result. It has been shown through measurements that as soon as the molten state is reached, the electrodes, which are being forced against the workpiece, begin to move into the metal and toward each other. Accordingly, it has been suggested that the detection of melting by sensing subsequent inward movement of the electrodes (indentation) or penetration is a potentially good way of determining the state of the weld. However, just because the metal reaches a molten state does not always insure that a good weld is made. For example, too much weld current will produce melting but not necessarily the formation of the weld nugget which is an important factor in generating a good weld. Still other parameters will effect the size and configuration of the weld nugget and the prior techniques of merely sensing inward movement of the electrodes into the workpieces cannot readily determine the extent of weld nugget growth. U.S. Pat. No. 4,419,558 to Stiebel accomplishes the detection of electrode travel indirectly by utilizing a load cell to monitor the squeezing force applied through the electrodes to the workpieces. Among the disadvantages with this construction is that its sensor is located very close to the position at which the weld is made and it does not lend itself to incorporation into many welding gun designs, especially self-equalizing guns that are connected to robot arm actuators. Apparently other attempts have been made to use detection of electrode movement to control the welding process but they have been unsuccessful because of the difficulty of measuring in an accurate and repeatable way the small distances involved in the travel of resistance spot welding electrodes, which are of the order of 0.001 inch.

Improved resistance spot welding apparatus is provided according to the present invention for automatically and consistently reliably detecting the quality of resistance spot welds. The apparatus includes a cylinder with two opposite ends and a piston assembly within the cylinder. The piston assembly has a piston rod extending through both of the ends of the cylinder. One end of the piston rod can be coupled to an electrode for making the weld and the opposite end of the piston rod can be coupled to a sensor asembly for detecting the quality of the resulting weld as a function of movement of the piston rod. The apparatus lends itself to a compact and relatively simple design that can be easily incorporated as part of a variety of resistance spot welding gun designs.

In the preferred embodiment, the sensor assembly is attached to the rear of the cylinder and includes a shaft attached at one end to the rearward end of the piston rod extending through the cylinder. A transversely mounted plate on the end of the shaft cooperates with a transducer mounted within the assembly to measure movement of the piston rod during the welding cycle. Since the piston rod is directly coupled to the electrode, extremely accurate measurements of electrode movement can be obtained, even though the sensor assembly is located some distance away from the electrode. As a result, the sensor assembly will not interfere with the welding operation and its measurement is less likely to be affected by the electromagnetic forces created at the electrode tips.

According to the method of this invention, the maximum forward position that the electrode reaches during the welding process is detected and subtracted from the distance that the electrode retracts from that maximum position to thereby provide an indication of the extent of weld nugget growth. The measurement of weld nugget growth can be used as a parameter in determining the quality of the weld and/or unfavorable trends of the welding operation.

BRIEF DESCRIPTION OF THE DRAWINGS

The various advantages of the present invention will become apparent to one skilled in the art upon reading the following specification and by reference to the drawings in which:

FIG. 1 is a side view of a spot resistance welding gun incorporating a weld quality sensor assembly made in accordance with the teachings of this invention;

FIG. 2 is a top view looking down on the sensor assembly;

FIG. 3 is a sectional view showing the details of the cylinder and piston rod construction of the gun;

FIGS. 4(A–C) are a sequence of views looking down onto the welding gun diagrammatically illustrating how the present invention operates to detect weld quality;

FIG. 5 is a graph showing a typical output of a transducer measuring the movement of the piston rod; and FIG. 6 is a block diagram of the circuitry used in the preferred embodiment.

BRIEF DESCRIPTION OF THE PREFERRED EMBODIMENT

FIG. 1 illustrates a resistance spot welding gun 10 incorporating the weld quality detection feature of the present invention. It should be noted from the outset that the present invention may be used in a wide variety of different welding gun constructions and that the gun 10 is but one of the preferred constructions. The construction of gun 10 is the subject of U.S. patent application Ser. No. 605,563 by Dimitrios G. Cecil filed Apr. 30, 1984 and entitled "Resistance Spot Welding Gun and Transformer Assembly". This application is hereby incorporated by reference and, accordingly, only those details which are necessary to the understanding of the present invention will be described herein.

Gun 10 is of the self-equalizing type which is mounted by way of a bracket 12 to a transformer 14. Secondary terminals 16 and 18 are connected to the ends of U-shaped, current carrying rolling shunts 20 and 22, respectively. The opposite end of shunt 20 is connected to an electrode holder 24 whereas the other end of shunt 22 is connected to an electrode holder 26. Electrodes 28 and 30 are respectively connected to holders 24 and 28 so that they mutually oppose each other.

The transformer mounting bracket 12 includes a pair of ears on each side of cylinder 32. In FIG. 1, two of the ears are shown and bear reference numerals 34 and 36. Guide shafts 38, 39 are disposed on either side of cylinder 32 and pass through holes in each of the bracket ears. Cylinder 32 is mounted for reciprocating movement along the guide shafts. Each of the lower sides of the cylinder 32 include a pair of radially outwardly projecting legs which are slidably mounted on the guide shafts. Legs 40 and 42 are shown in FIG. 1 and a rearward leg 44 is shown on the opposite side of cylinder 32 in FIG. 2. The belly of cylinder 32 is provided with a forked member 44 which is connected by way of bolts 46 to electrode holder 24.

Special attention should be drawn to the details of the construction of cylinder 32 as shown most clearly in FIG. 3. Cylinder 32 has two opposite ends 50, 52 and a piston rod 54 extends completely through the cylinder 32 and extends from opposite ends thereof. The forward piston rod end 56 is connected to electrode 30 through its holder 26 as can be seen most clearly in FIG. 1. The rearward end 58 of the piston 54 extends into a sensor assembly 60 mounted to the rear of cylinder 32. More will be said about sensor assembly 60 later herein. Piston rod 54 may be a multi-piece construction, if desired, for ease of manufacture. It is important, however, that the rearward end 58 follow very closely the movement of the forward end 56 of the piston rod to which the electrode 30 is connected.

In the example, cylinder 32 employs a dual piston head design including heads 60 and 62 connected to piston rod 54. Piston rod 54 is designed to slide axially in cylinder 32 on bearings 64, 66 and 68. An end cap 70 closes off the rearward end of cylinder 32 and is held in place by snap ring 72 or the like. Analogously, snap ring 74 is used on the forward end of cylinder 32. Bearings 66 and 68 are provided with internal passageways therein communicating with ports 76 and 78, respectively. When fluid pressure, particularly compressed air, is applied to port 78, the piston rod 54 is urged leftwardly whereas pressure applied to port 76 urges the piston rod 54 to the right. As shown in FIG. 1, pneumatic pressure is respectively coupled to ports 76 and 78 by way of hoses 80 and 82 which are connected to a suitable source of external air pressure (not shown). Suitable O-ring seals and the like are used in a conventional manner to maintain fluid pressure within cylinder 32.

Sensor assembly 60 includes a housing 80 which is suitably attached to the rearward end of cylinder 32 and moves therewith. In FIGS. 1 and 2 only the outline of housing 80 is shown to better illustrate the internal components therein. As will appear, the general function of the sensor assembly 60 is to detect electrode movement by sensing the corresponding movement of the piston rod 54 which extends rearwardly through cylinder 32. In the preferred embodiment, this is accomplished by way of an elongated shaft 82 threadedly coupled to the rearward end 58 of the piston rod 54 thereby serving as an extension thereof. A transversely extending plate 84 is fixed to the rearward end of shaft 82. The body of a linear variable displacement transducer (LVDT) 86 is rigidly mounted to the housing 80 by way of a suitable bracket 88. LVDT 86 can be of a conventional design which includes a plunger 90 adapted to convert movement of the piston rod 54 into related electrical signals. In the illustrated embodiment, plate 84 is provided with a nut and bolt assembly 92 located so that the bolt is aligned and in contact with plunger 90. It should be understood that other types of arrangements for sensing movement of the piston rod is also well within the skill of the ordinary practitioner.

The operation of the preferred embodiment of the method of the present invention is best understood by reference to FIGS. 4(A–C) where the major components of the apparatus are shown in simple diagrammatic form but bear the same reference numerals as their corresponding components described above in detail. In FIG. 4, the apparatus is shown in connection with making a weld between two workpieces 96 and 98. When air pressure is applied to port 78 of cylinder 32, piston rod 54 moves to the left carrying electrode 30 against the surface of workpiece 98. Cylinder 32 undergoes an opposite reaction and slides to the right thereby carrying electrode 28 against the surface of workpiece 96. The pressure between the workpieces can be adjusted by various means such as by the use of an adjustment spring 100 (FIG. 1) acting on shaft 102 which is coupled to the rearward end of cylinder 32 through a stop 104 mounted to bracket 12.

The output of transducer 86 during a typical weld cycle is shown in FIG. 5. When the electrodes reach the position shown in FIG. 4A, the voltage output of transducer 86 is at point A. The physical position of the piston rod 54 (more particularly, plate 84) is marked at location A in FIG. 4. The electrodes apply force to the workpieces for a predetermined period of time (squeeze time) and then current is applied to the electrodes. As shown in FIG. 4B (and point B in FIG. 5) the electrodes penetrate or indent the workpieces due in large part to the melting of the metal at the interface therebetween. As a result, piston rod 54 continues to move leftwardly. The maximum forward extent of the piston rod 54 is detected by transducer 86 and is shown at point B in FIG. 4B. After a predetermined period of time (weld time), power is removed from transformer 14 thereby turning off the welding current through the electrodes. However, the electrodes remain in contact with the workpiece. This is known as hold time. The hold time is selected to be sufficiently long to allow the weld nugget to solidify. The weld nugget is shown in exaggerated size at 106 in FIG. 4C. The formation of weld nugget 106 is known as weld nugget growth or expansion. Pursuant to the method of this invention, the extent of weld nugget growth is used as an indication of the quality of the weld. As shown in FIG. 4C (and at point C in FIG. 5), the electrode 30 (and therefore piston rod 54) actually moves in a reverse direction due to the growth of the weld nugget 106. Accordingly, the plate 84 moves a corresponding distance to the right to point C in FIG. 4C and a transducer plunger 90 senses this reverse movement. The extent of weld nugget growth is defined as the difference between the transducer outputs between points B and C.

FIG. 6 is a block diagram of electrical circuitry that can be used for measuring the extent of weld nugget growth. The output from transducer 86 is connected directly to one input of a comparator 110. Transducer 86 is also connected to a peak detector 112 whose output is connected to the other input of comparator 110. During forward movement of the electrode 30, (i.e. to the left), peak detector 112 serves to store the maximum output of transducer 86. Thus, it will ultimately store the transducer output associated with point B in FIGS. 4 and 5. When the weld nugget is created, the output of transducer 86 will be less than the value stored in peak detector 112 due to movement of the electrode 30 in the reverse or rightward direction. The output of comparator 110 is the difference between these two signals. The output of comparator 110 is connected to a sample and hold circuit 114. Sample and hold circuit 114 is of a conventional design and includes an enable input 116. Upon receipt of a suitable signal on line 116, the sample and hold circuit 114 will deliver its output to a limit comparator network 118. Preferably, the enable signal is generated substantially simultaneously with the termination of weld power, i.e. the removal of welding current to the electrodes. At this time, the comparator 110 will be providing a difference signal between points B and C and the output of sample and hold circuitry 114 will reflect this difference. At the end of the weld time, the growth of the weld nugget will have been substantially completed and any subsequent contraction due to cooling and other factors will not affect the measurement. The enable signal can be conveniently synchronized with the signal generated by conventional weld controllers that control the on/off power to the gun transformer.

The comparator network 118 has inputs defining certain predetermined reference levels or limit values. In this embodiment, one input defines a high limit (HI), another input a low limit (LO), and a third input (AP) defines a value above the low limit. If the weld nugget growth signal from circuit 114 is between the high and low limits, a visual indication (IN LIMITS) is provided by way of an LED 120 or other suitable device. If the weld nugget growth signal is above the low limit but below the predetermined approach limit, a second LED 122 is lighted. The use of this approach limit can be used to indicate to an operator that the trend of the weld nugget growth is approaching an unacceptable level so that an operator can take corrective action to prevent major problems. Comparator 118 can also be provided with another output line labeled "control" which can be coupled back to the welding system controller. If a bad weld or a consecutive number of bad welds are detected, then the controller can automatically stop further welding operations until corrective action is taken.

After the end of the hold time, the electrodes are opened. This is accomplished in this embodiment by providing air pressure to port 76 which moves the piston rod 54 to the right to retract electrode 30. A stop collar 130 connected to the forward end 56 of the piston rod 54 contacts a fixed member (not shown) to urge the cylinder 32 leftwardly to displace electrode 28 from the workpiece. When the electrodes are in their fully retracted position, the detection circuitry is reset and is ready for the next welding cycle.

If desired, the output of the transducer 86 can be coupled to a monitoring system employing a programmable data collection device or computer terminal. The data collection device can be used to collect information from the transducers of several different resistance spot welding guns in an automated facility. Thus, the data collection device can be programmed to provide a report to quality control personnel or the like that reflects the operation of the automated welding machinery. Analogously, the output of the transducer can be coupled to automatic control circuitry for performing other analysis of the information supplied by the transducer. In fact, the construction of the present invention lends itself to almost any analysis associated with movement of the electrodes and need not necessarily be limited to the weld nugget growth detection method described herein. It should also be understood that while this invention has been described in connection with particular examples thereof that other modifications will become apparent to those skilled in the art. For example, the "through the cylinder" piston rod assembly construction can be used in a variety of different welding gun designs such as the so-called "pincher-type" guns. In some of the pincher-type gun designs one cylinder is used to apply the squeezing force on the workpieces and a separate cylinder is used to retract the electrodes to their open position. In such designs, the cylinder applying the squeezing force would be provided with the piston rod extending through its rearward end and weld quality detection would be made by detecting movement of that piston rod. Analogously, the weld nugget growth detection method of this invention can be performed by other apparatus although the construction of the gun described above is preferred. Still other modifications falling within the spirit and scope of this invention will be appreciated by the skilled practitioner after a study of the specification, drawings and following claims.

I claim:

1. In an apparatus for detecting the quality of a resistance spot weld on workpieces using a welding gun, the improvement wherein:

said welding gun includes a fluid activated cylinder having two opposite ends, a piston assembly within the cylinder having a piston rod extending through both ends thereof, one end of the piston rod being coupled to a first electrode for contacting a surface of one of the workpieces, said cylinder being slidably mounted on supporting structure and being connected to a second electrode for contacting an opposite surface of the other workpiece to be welded to said one workpiece, the opposite end of the piston rod being coupled to a sensor assembly having a housing mounted for movement with the cylinder, whereby said sensor assembly provides output signals for detecting the quality of the weld as a function of piston rod movement relative to the cylinder.

2. The improvement of claim 1 wherein said sensor assembly comprises:

a shaft attached at one end to the rearward end of the piston rod; and transducer means coupled to the shaft for converting movement thereof into electrical signals, said transducer having a first part movable with the shaft and a second part fixed to the housing for the sensor assembly.

3. Apparatus for detecting weld nugget growth on workpieces during a welding operation using a resistance spot welding gun, said apparatus comprising:

a cylinder having a piston rod slidably mounted therein;

first and second electrodes;

first means for connecting the piston rod to said first electrode;

second means for causing said piston rod to move under fluid pressure within the cylinder in a first direction to move at least the first electrode against a surface of one of the workpieces toward the second electrode;

third means for applying power to the electrodes to begin the welding operation; and fourth means for sensing the difference between the relative spacing of the electrodes at a position of maximum penetration into the workpieces and at a position when the electrodes have subsequently separated from each other due to weld nugget growth between the workpieces, with said fourth means using at least in part a measurement of the movement of the piston rod to detect said difference.

4. The apparatus of claim 3 wherein the piston rod extends through opposite ends of the cylinder, one end of the piston rod being coupled to said first means and an opposite end of the piston rod being coupled to said fourth means.

5. The apparatus of claim 4 wherein said fourth means comprises:

transducer means for converting movement of said opposite piston rod end into electrical signals;

means for storing the peak signal developed by the transducer correspoding to the maximum amount of travel of the piston rod in the first direction thereby providing an indication of the maximum penetration of the electrodes into the workpiece;

means for obtaining a difference signal corresponding to the difference between the peak transducer signal and a subsequent transducer signal associated with the position of the piston rod when power is removed but while the electrodes remain in contact with the workpiece; and means for comparing the difference signal with predetermined criteria to determine characteristics of the weld.

6. The apparatus of claim 4 or 5 which further comprises:

a sensor assembly having a housing connected to the rear of the cylinder, said assembly including a linear variable displacement transducer having a first part mounted for movement with said opposite end of the piston rod and a second part fixed to the housing, adapted to provide output signals associated with the movement of said piston rod; and circuit means including a peak detector for receiving the output of said displacement transducer, difference means having inputs coupled to the displacement transducer and to the peak detector, operative to provide an output signal indicative of the difference therebetween; sample and hold means for storing said difference signal, fifth means for generating a signal when weld power is removed from the electrode, sixth means for defining at least one limit value, comparator means, and means responsive to the signal from the fifth means for coupling the output of the sample and hold means to the comparator means for comparing same with said limit value.

7. The apparatus of claim 6 wherein said sixth means defines high and low limit values, and wherein said circuit means is further adapted to provide an output indicating whether the signal from the sample and hold means is within the high and low limit values.

8. The apparatus of claim 7 wherein said sixth means further includes a third limit value greater than the low limit value, and means for providing an output indicating that the signal from the sample and hold means is below said third limit value whereby to provide an indication that the size of the weld nugget is approaching the low limit value.

9. In a self-equalizing resistance spot welding gun, the improvement comprising:

first and second electrodes adapted to squeeze opposite sides of workpieces together;

at least one cylinder having a body with two ends, a fluid actuated piston assembly including a piston rod extending through both ends of the cylinder, said cylinder being slidably mounted on supporting structure;

first means for connecting a forward end of the piston rod to one of said electrodes;

second means for connecting the body of the cylinder to the other electrode;

third means for selectively applying fluid pressure to the cylinder to cause said piston rod to slide within the cylinder in a first direction to move its associated electrode against a surface of one of the workpieces and to cause the cylinder to slide in an opposite direction to thereby move the other electrode against the other workpiece;

fourth means for applying current between the electrodes to begin the welding operation;

a sensor assembly having a housing attached to the rear of the cylinder and movable therewith, said sensor assembly including a shaft attached at one end to the rearward end of the piston rod, and transducer means for sensing movement of the shaft, said transducer means having a first part movable with the shaft and a second part fixed to the housing; and circuit means connected to said transducer for determining weld quality characteristics as a function of output signals from said transducer.

10. The improvement of claim 9 wherein said circuit means includes means for obtaining the difference between the transducer signal at the time of the maximum forward position of the shaft associated with the extent of penetration of the electrodes into the workpieces and the transducer signal at substantially the time that weld current is removed when the electrodes have separated due to weld nugget growth.

11. A method for detecting the quality of a weld between two workpieces during resistance spot welding operations using apparatus having at least one movable electrode for contacting a surface of one of the workpieces, said method comprising:

contacting opposite sides of the workpieces with two opposing electrodes, at least one of the electrodes being said movable electrode;

applying power to the electrodes;

generating a first signal associated with the relative spacing between the electrodes at a position of maximum penetration into the workpieces;

storing said first signal;

subsequently generating a second signal associated with the relative spacing between the electrodes when the electrodes have separated from each other yet remain in contact with the workpieces; and using the difference between the first and second signals to provide an indication of the quality of the weld.

12. The method of claim 11 wherein the spacing between the electrodes is sensed by a transducer measuring the movement of a rearward end of a piston rod that is connected to the movable electrode at its forward end.

13. The method of claim 12 wherein the apparatus is a self-equalizing welding gun where both electrodes are movable relative to each other, with the transducer including a first part mounted for movement with the piston rod and a second part mounted for movement with the other electrode.

14. A method for detecting the quality of a weld between two workpieces during resistance spot welding operations using a self-equalizing welding gun, said gun having first and second movable electrodes opposing each other, with at least said first electrode being movable under control of a fluid actuated cylinder, said method comprising:

mounting a sensor assembly to an end of the cylinder opposite said first electrode, said sensor assembly including transducer means having a first part movable with a piston rod in the cylinder whose one end is connected to said first electrode, said transducer means having a second part movable with said second electrode whereby said transducer means provides signals associated with the relative movement between the two electrodes;

applying fluid pressure to the cylinder to cause said electrodes to move toward each other to contact opposite surfaces of the workpieces;

applying electrical power to the electrodes;

monitoring the output of the transducer and storing a first signal therefrom associated with the position of the electrodes at a position of maximum penetration thereof into the workpieces;

continuing to monitor the output of the transducer means and selecting a second signal therefrom associated with the position of the electrodes when the electrodes have separated from each other from the position of maximum penetration but while the electrodes are still in contact with the workpieces; and using the difference between the first and second signals to provide an indication of the quality of the weld between the workpieces.

15. The method of claim 14 wherein said second electrode is connected to the cylinder and movable therewith, with said second part of the transducer means being mounted for movement with said cylinder.

16. A self-equalizing welding gun including means for providing an indication of weld quality, said gun comprising:

support means for holding a transformer for supplying power;

a cylinder having a body with two ends, said cylinder being slidably mounted on said support means, the cylinder having a piston assembly therein including a piston rod extending through both ends of the cylinder;

a first electrode connected to a forward end of the piston rod;

a generally U-shaped arm connected at one end to said cylinder;

a second electrode connected to an opposite end of said arm in opposing alignment with said first electrode;

third means for selectively applying fluid pressure to the cylinder to cause said piston rod to slide within the cylinder to move the first electrode against a surface of one of the workpieces and to cause the cylinder to slide in opposite direction to thereby move the second electrode against the other workpiece;

means for selectively applying power from said transformer to said electrodes;

a sensor assembly having a housing attached to the rear of the cylinder and movable therewith, said sensor assembly having a first part movable with said piston rod and a second part affixed to the housing of the sensor assembly, and transducer means for generating electrical signals associated with relative movement between the first and second parts thereby providing an output associated with the relative spacing between said electrodes which can be used to determine the quality of the weld.

17. The gun of claim 16 wherein said transducer is a linear variable differential transformer.

* * * * *